Sept. 16, 1947.  C. E. MORLEY ET AL  2,427,469
ADJUSTABLE TEMPLE CONSTRUCTION FOR GOGGLES
Filed April 24, 1944

INVENTORS
CHARLES E. MORLEY
BY HAROLD S. DAVIS

ATTORNEYS

Patented Sept. 16, 1947

2,427,469

UNITED STATES PATENT OFFICE 2,427,469

ADJUSTABLE TEMPLE CONSTRUCTION FOR GOGGLES

Charles E. Morley and Harold S. Davis, Detroit, Mich.

Application April 24, 1944, Serial No. 532,407

1 Claim. (Cl. 2—14)

This invention relates to an improved temple construction for goggle and spectacle use, and has for its object an improved organization of parts by whose use a lens-supporting frame may have its component and contributive parts as herein disclosed quickly and reliably positioned to conform accurately and comfortably to the particular head contour and relative positions of the ears of the wearer.

The satisfactory meeting of these requisites involves quick and reliable adjustability of the temple members relatively to the lens-supporting frame in two respects: angularity and length; and it is the purpose of the construction herein shown to make this possible and easy of attainment.

Figure 1:
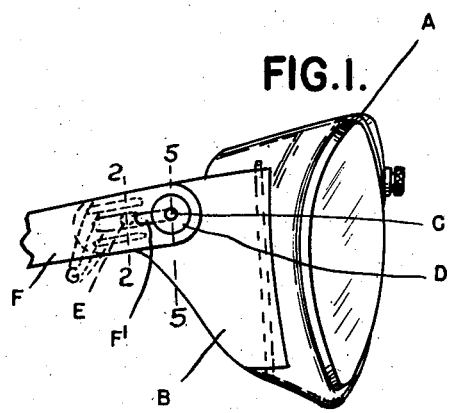
Figure 1 is a perspective view of one end of a lens-supporting frame with which our specially formed adjustable temple pieces are operatively associated.
Figure 2:
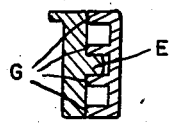
Figure 2 is a large scale sectional elevational view taken along the line 2—2 of Figure 1.
Figure 3:
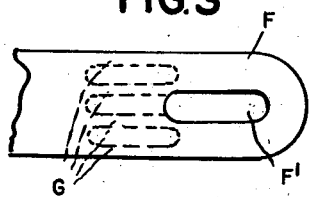
Figures 3 and 4 are similar large scale spaced elevational views of the overlapping portions of the frame extension piece, and of the temple shown in Figure 2.
Figure 4:
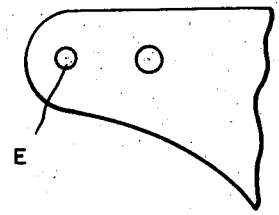

Referring to our invention illustrated in Figures 1 to 5 inclusive, at A in Figure 1 is shown the right-eye unit of a lens-supporting frame, which is designed to be supported in proper position in front of the eyes of the wearer. As in the structure shown in our heretofore filed application, Serial No. 488,666, filed May 27, 1943, and now matured into Patent No. 2,411,933, dated December 3, 1946, extending rearwardly from the strictly lens-supporting portion of the frame, and generally perpendicularly to the plane thereof, is a shield piece or extension B, near whose rearward end is positioned a traversing stem or stud C provided with a milled clamping nut D. Also, preferably integral with the shield B and in suitable relative position to the stud C, is a projection E, which performs the function of limiting the movement of the temple member F whose slot F' is traversed by the stud or stem C. Thus by tightening of the milled nut D on the stud C the temple F may be locked in any desired position of angularity and of relative projection, as limited of course by the length of the slot, forwardly or rearwardly with respect to the frame shield piece B, thus making it possible to fit the temple piece's rear extension accurately in relation to the ears of the wearer. If a long extension of the temple piece is desired, it will of course be rearwardly retracted until the stem C occupies the extreme forward end of the slot F'.

Figure 5:
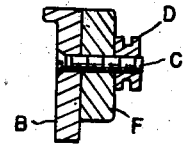
Figure 5 is a similar sectional elevational view taken along the line 5—5 of Figure 1.

To provide for adjustment of the temple piece F as to angularity, its desired position may be arrived at before the milled clamping nut D is screwed down tightly, thus forcing the projection E against the adjacent surface of the temple piece. Under some circumstances this is sufficient in itself, but we have found it advantageous to provide a plurality of ridges or corrugations, as G, (Figs. 2 and 3), extending lengthwise of the temple piece F, between any two of which the projecting point E (Figs. 2 and 4) of the shield may engage; as many of these ridges as desired may be provided, dependent upon the minuteness of the attained angle variance of the temple piece as between a satisfactory and unsatisfactory fit over the ears. This ridged or corrugated construction is shown in cross-sectional elevation in Figure 2, but Figure 5 is also offered to emphasize the fact that under some circumstances an adequately tight angular adjustment may be had by merely clamping the two plain surfaces, temple piece and frame shield, tightly together, in reliance upon the friction of the surfaces thus placed in contact for their thus adjusted position to be maintained.

The shield-traversing bolt C and its milled nut D may be looked upon as merely one of a variety of equivalent clamping constructions which may be resorted to, to effect the anchorage of the temple member in its desired position of forward or rearward projection and of angularity, so that it will be held thus until intentionally disturbed.

What we claim is:

An eye protecting device comprising a lens supporting frame having a side shield member and a temple member having the front end portion overlapping the side shield member, means projecting laterally from the overlapping portion of one member through an elongated slot in the adjacent portion of the other member to enable fore and aft sliding movement of the temple member relative to the side shield, the overlapping portion of one member also having vertically spaced grooves elongated in the direction of said slot and the adjacent portion of the other member having a projection selectively engageable in the grooves to vary the angular position of the temple member relative to the shield member, and means for clamping the temple member to the shield member in any one of the adjusted positions of the temple member.

CHARLES E. MORLEY.
HAROLD S. DAVIS.

REFERENCES CITED

The following references are of record in the file of this patent:

UNITED STATES PATENTS

| Number | Name | Date |
|---|---|---|
| 2,172,959 | Hirtenstein | Sept. 12, 1939 |
| 624,369 | McLernon | May 2, 1899 |